(12) United States Patent
Takemoto

(10) Patent No.: US 8,284,272 B2
(45) Date of Patent: Oct. 9, 2012

(54) ELECTRONIC CAMERA

(75) Inventor: Koji Takemoto, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 695 days.

(21) Appl. No.: 12/394,661

(22) Filed: Feb. 27, 2009

(65) Prior Publication Data

US 2009/0219408 A1  Sep. 3, 2009

(30) Foreign Application Priority Data

Feb. 28, 2008 (JP) .................................. 2008-047896
Aug. 30, 2008 (JP) .................................. 2008-222962

(51) Int. Cl.
*H04N 9/73* (2006.01)

(52) U.S. Cl. .................................. 348/224.1; 348/223.1

(58) Field of Classification Search ............... 348/221.1, 348/222.1, 223.1, 224.1, 225.1, 229.1, 230.1, 348/234, 296, 297, 362, 363, 364
See application file for complete search history.

(56) References Cited

U.S. PATENT DOCUMENTS

| | | | |
|---|---|---|---|
| 5,576,839 A | | 11/1996 | Morimoto et al. |
| 5,602,412 A | * | 2/1997 | Suzuki et al. .................. 257/432 |
| 5,818,523 A | * | 10/1998 | Ban ............................ 348/224.1 |
| 5,999,215 A | | 12/1999 | Tamura |
| 6,927,792 B1 | * | 8/2005 | Mimura et al. ............. 348/223.1 |
| 7,554,601 B2 | | 6/2009 | Choi |
| 7,777,792 B2 | * | 8/2010 | Yamazaki et al. ............ 348/248 |
| 2004/0212696 A1 | | 10/2004 | Tsugita et al. |
| 2005/0162532 A1 | | 7/2005 | Toyoda |
| 2008/0143845 A1 | | 6/2008 | Miki et al. |
| 2008/0151071 A1 | | 6/2008 | Takayama |
| 2011/0279704 A1 | | 11/2011 | Takayama |

FOREIGN PATENT DOCUMENTS

| | | |
|---|---|---|
| 3P | 2006-033519 A | 2/2006 |
| CN | 1649418 A | 8/2005 |
| CN | 1719875 A | 1/2006 |
| JP | 05-316519 A | 11/1993 |
| JP | 06-098253 A | 4/1994 |
| JP | 2000-156874 A | 6/2000 |

(Continued)

OTHER PUBLICATIONS

Chinese Office Action dated Oct. 13, 2010, issued in corresponding Chinese Patent Application No. 200910117990.6.

(Continued)

*Primary Examiner* — Chieh M Fan
*Assistant Examiner* — Peter Chon
(74) *Attorney, Agent, or Firm* — Westerman, Hattori, Daniels & Adrian, LLP

(57) ABSTRACT

An electronic camera is provided with: a gain information calculator for calculating gain information indicating a gain of a color information signal in a predetermined aperture state based on a gain of a color information signal obtained by performing a white balance adjustment using an object image signal; a storer for storing the gain information calculated by the gain information calculator, a detector for detecting a difference between an aperture state at a time of photographing and a predetermined aperture state; a corrector for correcting the gain information stored by the storer based on the difference detected by the detector; and an adjustor for adjusting the color information signal at a time of photographing by using the gain information corrected by the corrector.

2 Claims, 16 Drawing Sheets

FOREIGN PATENT DOCUMENTS

| | | |
|---|---|---|
| JP | 2000-244930 A | 9/2000 |
| JP | 2001-211457 A | 8/2001 |
| JP | 2002-247590 A | 8/2002 |
| JP | 2002-040417 A | 2/2004 |
| JP | 2004-247872 A | 9/2004 |
| JP | 2004-297650 A | 10/2004 |
| JP | 2004-328117 A | 11/2004 |
| JP | 2006-025339 A | 1/2006 |
| JP | 2006-148794 A | 6/2006 |
| JP | 2007-159027 A | 6/2007 |
| JP | 2008-153768 A | 7/2008 |
| JP | 2008-160477 A | 7/2008 |

OTHER PUBLICATIONS

Japanese Office Action dated May 22, 2012, issued in corresponding Japanese Patent Application No. 2008-222962, English translation only (4 pages).

Japanese Office Action dated May 22, 2012, issued in corresponding Japanese Application No. 2008-047896, English translation only (3 pages).

* cited by examiner

ELECTRONIC CAMERA

CROSS REFERENCE OF RELATED APPLICATION

The disclosures of Japanese Patent Applications No. 2008-047896, which was filed on Feb. 28, 2008, and No. 2008-222962, which was filed on Aug. 30, 2008 are incorporated herein by reference.

BACKGROUND OF THE INVENTION

1. Field of the Invention

The present invention relates to an electronic camera. More particularly, the present invention relates to an electronic camera that stores a white-balance adjustment value preferred by a user so as to perform a white balance adjustment, for example.

2. Description of the Related Art

According to one example of this type of a camera, based on image data, which is obtained by imaging a white object under an illumination light used at an actual imaging time and which is outputted from an imaging device at that time, adjustment values such as an R gain and a B gain for a white balance adjustment are determined in a manner to bring a color temperature of the object on a screen closer to white, and the white balance adjustment is performed based on these white-balance adjustment values. Then, the white-balance adjustment values once determined are valid under the illumination light when determining the white-balance adjustment values. Therefore, when a light source color changes as a result of an elapse of time or a movement of a photography location, there is a case that the white balance is not so adjusted as to whiten the white object. Therefore, when there is a large difference in luminance value between at the time of determining the white-balance adjustment values and at a time of photographing, an automatic white balance adjustment is performed without using the adjustment values. However, there occurs a case that in the above-described camera, for example, when there is the large difference in luminance value between at the time of determining the white-balance adjustment values and at a time of photographing, the automatic white balance adjustment is performed, and thus, even when a user attempts to store and use the preferred white-balance adjustment values, the adjustment values are not reflected on the photographing, which is a problem. Furthermore, there is a case that if an aperture state of an optical system changes, the white balance is deviated even when a light source color does not change. Moreover, when there is a change in an amplification factor of an amplifier for amplifying an object image signal obtained by photographing, there is a case that the white balance is deviated even when the light source color is not changed until in the end.

SUMMARY OF THE INVENTION

An electronic camera according to the present invention, comprises: a gain information calculator for calculating gain information indicating a gain that is imparted to a color information signal obtained by performing a white balance adjustment in a predetermined optical aperture state based on a gain that has been imparted to a color information signal obtained by performing a white balance adjustment by using an object image signal; a storer for storing the gain information calculated by the gain information calculator, a detector for detecting a difference between an aperture state at a time of photographing and the predetermined optical aperture state; a corrector for correcting the gain information stored by the storer based on the difference detected by the detector, and an adjustor for adjusting a color information signal at a time of photographing by using the gain information corrected by the corrector.

Preferably, when there is a difference between an optical aperture state when an object image signal used for the white balance adjustment is obtained and the predetermined optical aperture state, the gain information calculator calculates the gain information indicating a gain that is imparted to the color information signal obtained by performing the white balance adjustment in the predetermined optical aperture state by correcting the gain that has been imparted to the color information signal obtained by performing the white balance adjustment according to the difference.

Preferably, the gain information calculator performs the white balance adjustment by obtaining the object image signal in a state set to the predetermined optical aperture state thereby calculating the gain information indicating the gain that is imparted to the color information signal obtained by performing the white balance adjustment in the predetermined optical aperture state.

An electronic camera according to the present invention, comprises: a gain information calculator for calculating gain information indicating a gain that has been imparted to a color information signal obtained by performing a white balance adjustment by using an object image signal; a first storer for storing the gain information calculated by the gain information calculator, a second storer for storing aperture information indicating an optical aperture state when an object image signal used for the white balance adjustment is obtained; a detector for detecting a difference between an optical aperture state at a time of photographing and an optical aperture state indicated by the optical aperture information stored by the second storer; a corrector for correcting the gain information stored by the first storer based on the difference detected by the detector; and an adjustor for adjusting a color information signal at a time of photographing by using the gain information corrected by the corrector.

An electronic camera according to the present invention, comprises: an amplifier for amplifying an object image signal; a gain information calculator, based on a gain that has been imparted to a color information signal obtained by performing a white balance adjustment by using an object image signal, for calculating gain information indicating a gain that is imparted to the color information signal obtained by performing a white balance adjustment in a state that the object image signal is amplified as a result of the amplifier being imparting a predetermined amplification factor, a storer for storing the gain information calculated by the gain information calculator; a detector for detecting a difference between an amplification factor to be imparted by the amplifier to the object image signal at a time of photographing and the predetermined amplification factor; a corrector for correcting the gain information stored by the storer based on the difference detected by the detector; and an adjustor for adjusting a color information signal at a time of photographing by using the gain information connected by the corrector.

Preferably, when there is a difference between the amplification factor that is imparted by the amplifier to the object image signal when an object image signal used for the white balance adjustment is obtained and the predetermined amplification factor, the gain information calculator corrects the gain that has been imparted to the color information signal obtained by performing the white balance adjustment according to the difference, thereby calculating the gain information indicating the gain that is imparted to the color information signal obtained by performing a white balance adjustment in a state that the object image signal is amplified as a result of the amplifier being imparting a predetermined amplification factor.

Preferably, the gain information calculator performs the white balance adjustment by obtaining the object image signal in a state that the object image signal is amplified as a result of the amplifier being imparting the predetermined amplification factor, thereby calculating the gain information indicating the gain that is imparted to the color information signal obtained by performing the white balance adjustment in a state that the object image signal is amplified as a result of the amplifier being imparting the predetermined amplification factor.

An electronic camera according to the present invention, comprises: an amplifier for amplifying an object image signal; a gain information calculator for calculating gain information indicating a gain that has been imparted to a color information signal obtained by performing a white balance adjustment by using an object image signal; a first storer for storing the gain information calculated by the gain information calculator; a second storer for storing amplification factor information indicating an amplification factor at a time that the amplifier amplifies the object image signal when the object image signal used for the white balance adjustment is obtained; a detector for detecting a difference between the amplification factor when the amplifier amplifies the object image signal at a time of photographing and the amplification factor indicated by the amplification factor information stored by the second storer; a corrector for correcting the gain information stored by the first storer based on the difference detected by the detector, and an adjustor for adjusting a color information signal at a time of photographing by using the gain information corrected by the corrector.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
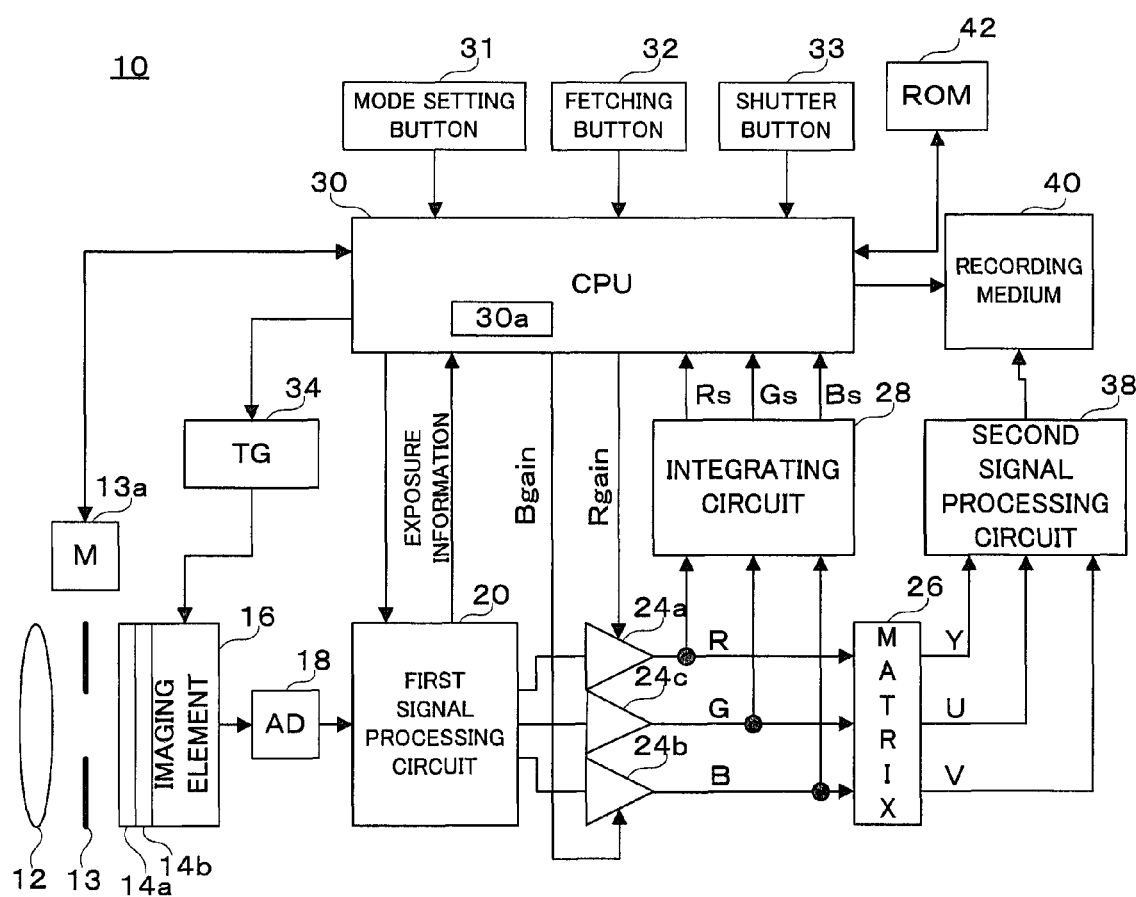
FIG. 1 is a functional block diagram showing an embodiment of the present invention.

With reference to FIG. 1, a digital camera 10 of this embodiment is an electronic camera including a lens 12. An optical image of an object is incident upon a light-receiving surface of an imaging element 16 via the lens 12, an aperture device 13 that is driven by a drive device 13a, an infrared cut filter 14a attached to a front surface of the imaging element 16, and a primary color filter 14b. It is noted that the aperture device 13 has a mechanism for setting either to an opened aperture state in which an opening is large or a small aperture state in which an opening is small. Further, the primary color filter 14b has R, G and B filter elements corresponding to each pixel. Therefore, an amount of electric charges produced in each light-receiving element formed on the light-receiving surface reflects a light amount of R, G, or B.

A timing generator (TG) 34 reads out the electric charges (pixel signal) produced in the imaging element 16. The pixel signal, which is a read-out object image signal, is converted into a digital signal, i.e., pixel data, by an AD converter 18, and the converted pixel data is inputted to a first signal processing circuit 20. The first signal processing circuit 20 detects a brightness of the object scene image from the inputted pixel data so as to create exposure inform on indicating an exposure state in the imaging element 16, and outputs this information to a CPU 30.

The exposure information is used to control the aperture device 13, and also to control a shutter speed of an electronic shutter by the timing generator (TG) 34 and an AGC within the first signal processing circuit 20. The first signal processing circuit 20 performs signal processes, such as a CDS and the above-described AGC, on the inputted pixel data, and also performs color separation on the pixel data on which such signal processes are performed. Thereby, each pixel becomes to have all color information, i.e., R, G, and B. Thus, R data, G data, and B data of the same pixel are outputted simultaneously from the first signal processing circuit 20.

The R data is imparted Rgain by an amp 24a, the B data is imparted Bgain by an amp 24b, and the G data is imparted Ggain by an amp 24c. The R data, the B data, and the G data that have been imparted with the gains by the amps 24a, 24b, and 24c are subjected to a matrix calculation by a matrix circuit 26. Thereby, Y data, U data, and V data are produced. It is noted that "to impart a gain" means to amplify according to the gain.

The R data, the G data, and the B data are inputted also to an integrating circuit 28 at a time of a custom white-balance setting mode described later. The integrating circuit 28 integrates each of the R data, G data, and B data. Thereby, integrated values Rs, Gs, and Bs are produced during one frame period.

In a state that the custom white-balance setting mode is set by operating a mode setting button 31 and when a fetching button 32 is operated so as to photograph a previously prepared white-color object, the CPU 30 exposes the imaging element 16. The pixel data obtained by the exposure is integrated by the integrating circuit 28 for each color. From the integrating circuit 28, integrated values Rs, Gs, and Bs are outputted. Based on these values Rs, Gs, and Bs outputted from the integrating circuit 28, the CPU 30 analyzes the object image signal so as to calculate such gains, i.e., Rgain and Bgain, that a level ratio among the integrated values Rs, Bs, and Gs reaches 1:1:1, i.e., that a color of the object becomes gray (achromatic color). The calculated Rgain and Bgain are subjected to a correcting process according to a state of the aperture device 13 at a time point when the exposure is performed as a result of the fetching button 32 being operated, and are stored in a register 30a as gain information Rw and Bw. The details are described later.

Thereafter, the CPU 30 performs a correcting process on the Rw and the Bw read out from the register 30a according to a state of the aperture device 13 at a time point when the imaging element 16 is exposed as a result of the shutter button 33 being operated, and using each of the corrected Rw and Bw as the Rgain and the Bgain, respectively; sets the gains of the amp 24a and amp 24b. The details are described later.

When the shutter button 33 is operated, the imaging element 16 is exposed, and the R data and the B data obtained by this exposure are passed through the amp 24a and the amp 24b to which the gains are set, as described above, so as to be imparted with the gains.

The R data, the B data, and the G data that have been imparted with the gains in the amps 24a, 24b, and 24c are subjected to a matrix calculation by the matrix circuit 26. Thereby, the Y data, the U data, and the V data on which the white balance adjustment is performed are produced. The Y data, the U data, and the V data produced in the matrix circuit 26 undergo a compression process by a second signal processing circuit 38, and thereafter, are recorded on a recording medium 40.

It is noted that one of the reasons for a deviation in the white balance when the aperture state of the optical system is changed is probably due to the fact that the incident angle of light upon the infrared cut filter 14a or the primary color filter 14b is changed due to a change in the aperture state.

Figure 2:
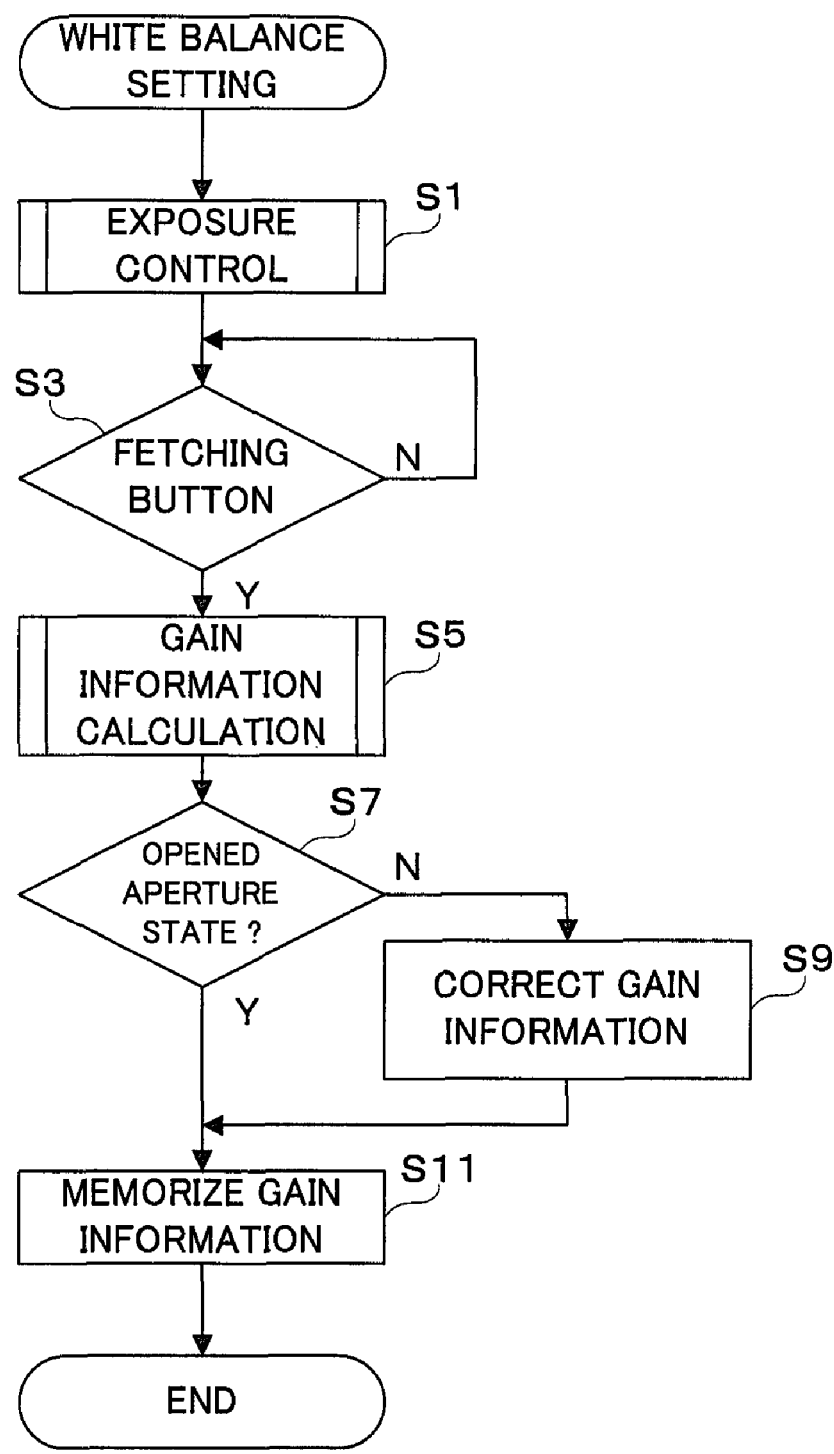
FIG. 2 is a flowchart showing an operation of the embodiment of the present invention.
Figure 3:
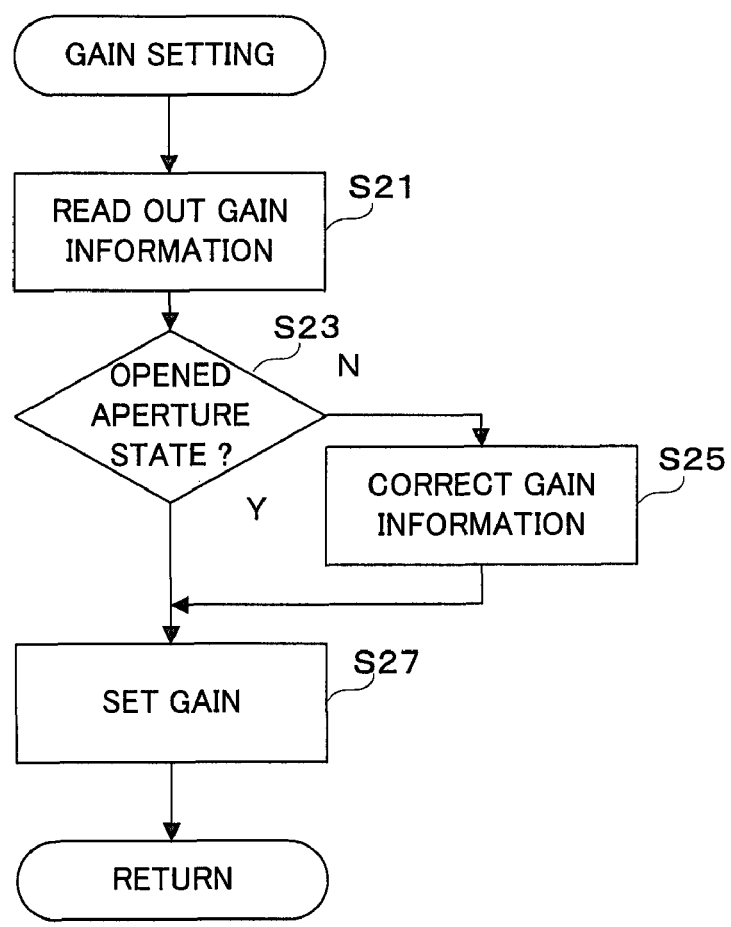
FIG. 3 is a flowchart showing the operation of the embodiment of the present invention.

The CPU 30 processes a flowchart shown in FIG. 2 and FIG. 3. It is noted that a control program corresponding to this flowchart is stored in a ROM 42.

When the mode setting button 31 is operated so that the custom white-balance setting mode is set, exposure control is firstly performed as a white-balance setting operation (step S1). In the step S1, the brightness of the object scene image is detected from the inputted pixel data thereby to detect an exposure state in the imaging element 16, and then, the aperture device 13, the shutter speed of the electronic shutter by the timing generator (TG) 34, or the AGC within the first signal processing circuit 20 is controlled. By controlling in this way, the optimum exposure is obtained in the imaging element 16.

Thereafter, when the fetching button 32 is operated to photograph a previously prepared white-color object, in order to perform the white balance adjustment, the CPU 30 exposes the imaging element 16. The pixel data obtained by the exposure is integrated by the integrating circuit 28 for each color. From the integrating circuit 28, the integrated values Rs, Gs, and Bs are outputted. Based on these values Rs, Gs, and Bs, the CPU 30 analyzes a screen so as to calculate such gains, i.e., Rgain and Bgain, that the level ratio among the R data, the G data, and the B data reaches 1:1:1, i.e., that the color of the object becomes gray (achromatic color) (steps S3 and S5).

Subsequently, it is detected whether or not the aperture device 13 is in the opened aperture state (step S7). When the aperture device 13 is in the opened aperture state, the Rgain and the Bgain calculated in the step S5 are stored as such in the register 30a as the gain information Rw and Bw (steps S7 and S11), and the white-balance setting operation is ended.

When it is detected in the step S7 that the aperture device 13 is not in the opened aperture state, i.e., it is detected that the aperture device 13 is in the small aperture state, the Rgain and the Bgain calculated in the step S5 are corrected by using Equation 1, and the obtained gain information Rw and Bw are stored in the register 30a (steps S7, S9, and S11), and then, the white-balance setting operation is ended.

$Rw=Rgain/K$ (K is a constant smaller than 1)

$Bw=Bgain$ (Equation 1)

A value of K is determined through experiments, and is about 0.7 to 0.9, for example.

By correcting the Rgain and the Bgain calculated in the step S5 by using Equation 1, there obtains gain information indicating the gain of the color information signal in the opened aperture state, based on the gain of the color information signal obtained by performing the white balance adjustment using the object image signal.

When the shutter button 33 is operated after storing the gain information Rw and Bw in the register 30a, the custom white balance photography is performed. At this time, the CPU 30 processes a flowchart shown in FIG. 3 as setting of the gain relating to the color information signal.

Firstly, the gain information Rw and Bw stored in the register 30a are read out (step S21). Subsequently, it is detected whether or not the aperture device 13 is in the opened aperture state (step S23). When the aperture device 13 is in the opened aperture state, the gain information Rw and Bw read out in the step S21 are set as such as the Rgain and the Bgain. In this way, the gains of the amps 24a and 24b are set (steps S23 and S27).

When it is detected in the step S23 that the aperture device 13 is not in the opened aperture state, i.e., when the aperture device 13 is in the small aperture state, the gain information Rw and Bw read out in the step S21 are corrected by using Equation 2, and the obtained Rgain and Bgain are set as the gains of the amps 24a and 24b (steps S23, S25, and S27).

$Rgain=Rw*K$ (K is a constant smaller than 1)

$Bgain=Bw$ (Equation 2)

Thereafter, the R'data, B data, and G data that have been imparted with the gains in the amps 24a, 24b, and 24c are subjected to a matrix calculation by the matrix circuit 26. Thereby, the Y data, U data, and V data on which the white balance adjustment is performed are produced. The Y data, the U data, and the V data produced in the matrix circuit 26 undergo a compression process in the second signal processing circuit 38, and then, are recorded on the recording medium 40.

According to this embodiment, the gain information Rw and Bw stored by the white-balance setting operation are calculated and stored as the gain information indicating the gain that is imparted to the color information signal obtained by performing the white balance adjustment in the opened aperture state based on the gain that has been imparted to the color information signal obtained by performing the white balance adjustment using the object image signal. Thereafter, when it is detected that the aperture device 13 is in the small aperture state at a time of performing the custom white balance photography as a result of the shutter button 33 being operated, the read-out gain information Rw and Bw are corrected and the obtained Rgain and Bgain are set as the gains of the amps 24a and 24b. Therefore, a result of the white balance adjustment set, as the white-balance setting operation, before photographing can be reflected at a time of photographing, by diminishing an influence in which the white balance is deviated by the change in the aperture state.

It is noted that in this embodiment, in order to calculate the gain information indicating the gain that is imparted to the color information signal obtained by performing the white balance adjustment in a predetermined optical aperture state, based on the gain that has been imparted to the color information signal obtained by performing the white balance adjustment by using the object image signal, when the aperture device 13 is set to the small aperture states a result of the exposure control in the white-balance setting operation, the Rgain and the Bgain calculated in the step S5 are corrected so as to calculate the gain information Rw and Bw that are stored in the register 30*a*. However, when the CPU 30 processes a flowchart shown in FIG. 4 instead of the flowchart shown in FIG. 2, there is no need to perform the correction. When it is so arranged to calculate the gain information indicating the gain that is imparted to the color information signal obtained by performing the white balance adjustment in a predetermined optical aperture state by performing the white balance adjustment by obtaining the object image signal in a state of being set to a predetermined optical aperture state, there is no need to perform the correction.

That is, when the mode setting button 31 is operated so that a current mode is set to the custom white-balance setting mode, the CPU 30 firstly sets the aperture device 13 to the opened aperture state, as the white-balance setting operation (step S31). Thereafter, the CPU 30 performs the exposure control in a state that the aperture device 13 is fixed in the opened aperture state (step S33). In the step S33, the brightness of the object scene image is detected from the inputted pixel data thereby to detect an exposure state in the imaging element 16, and then, the shutter speed of the electronic shutter by the timing generator (TG) 34 or the AGC within the first signal processing circuit 20 is controlled. By controlling in this way, the optimum exposure is obtained in the imaging element 16.

Thereafter, when the fetching button 32 is operated to photograph a previously prepared white-color object, in order to perform the white balance adjustment, the CPU 30 exposes the imaging element 16. The pixel data obtained by the exposure is integrated by the integrating circuit 28 for each color. From the integrating circuit 28, the integrated values Rs, Gs, and Bs are outputted. Based on these values Rs, Gs, and Bs, the CPU 30 analyzes a screen so as to calculate such gains, i.e., Rgain and Bgain, that the level ratio among the integrated values Rs, Gs, and Bs reaches 1:1:1, i.e., that the color of the object becomes gray (achromatic color) (steps S35 and S37).

Thus, the Rgain and the Bgain calculated in the step S37 are stored as such in the register 30*a* as the gain information Rw and Bw (step S39), and then, the white-balance setting operation is ended.

Figure 4:
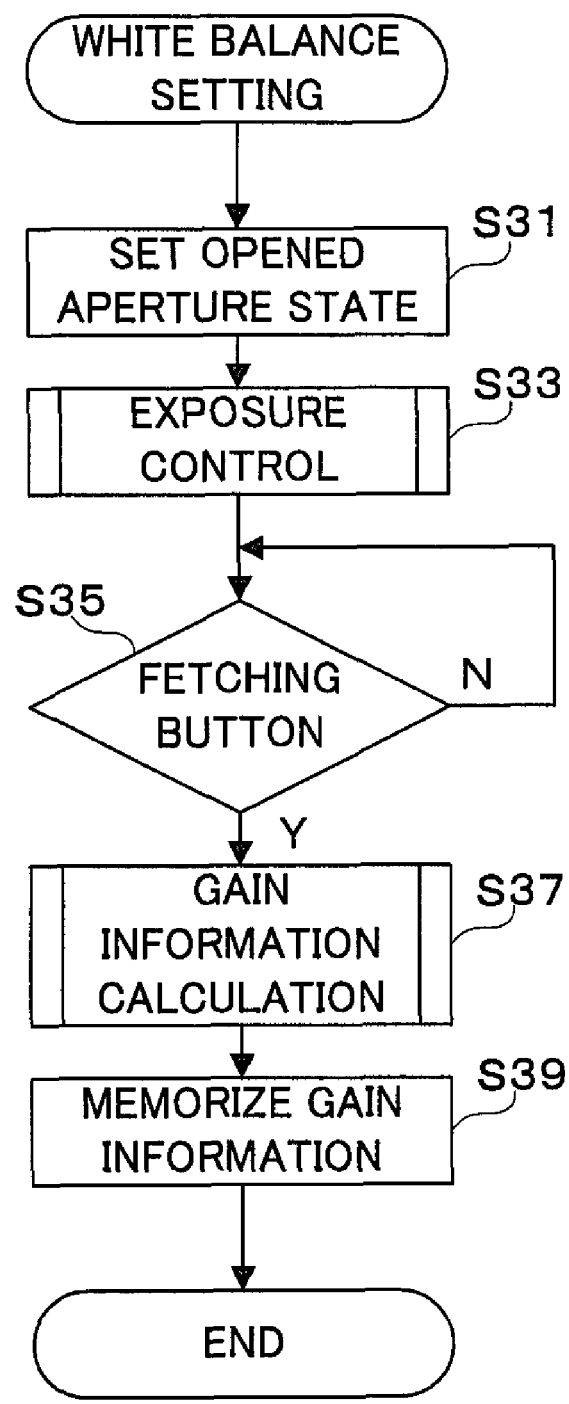
FIG. 4 is a flowchart showing another operation of the embodiment of the present invention.

It is noted that after the flowchart shown in FIG. 4 is processed instead of the flowchart shown in FIG. 2 and the gain information Rw and Bw are stored in the register 30*a*, the custom white balance photography is performed when the shutter button 33 is operated. At that time, the CPU 30 processes the above-described flowchart shown in FIG. 3. Therefore, its description is omitted.

Figure 5:
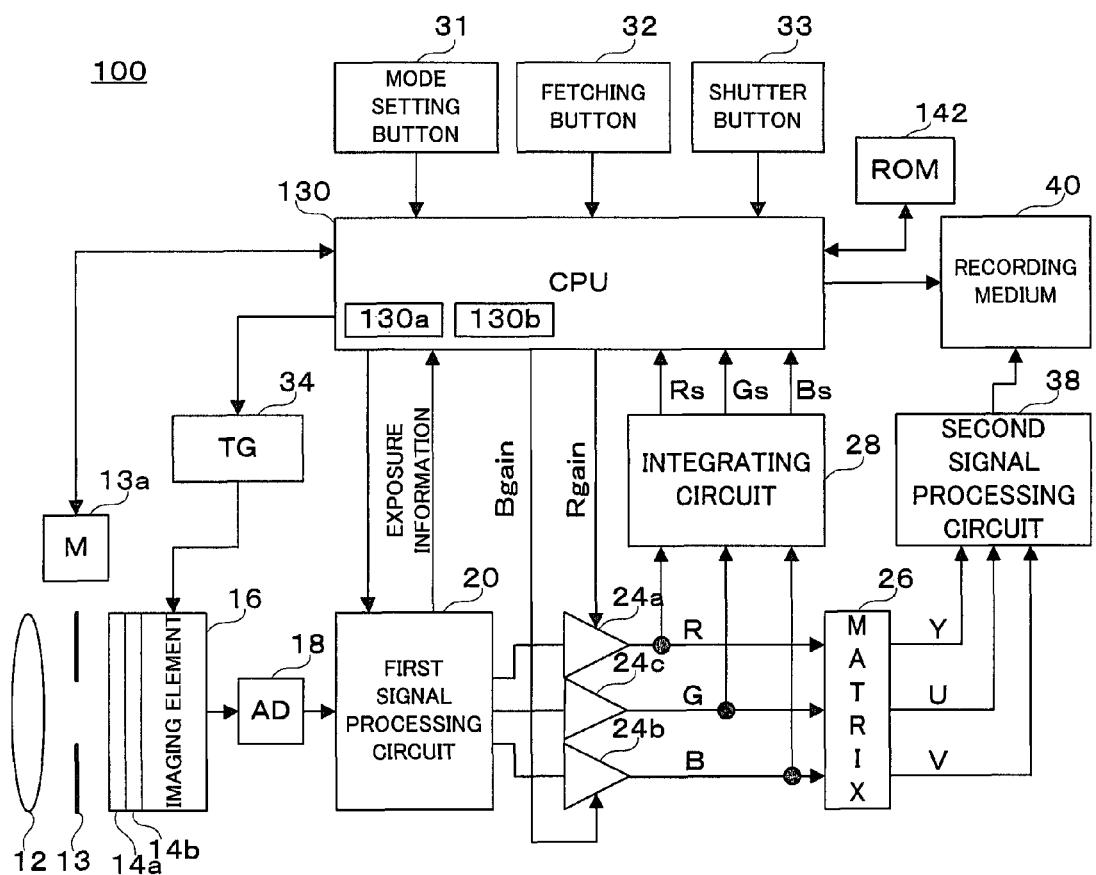
FIG. 5 is a functional block diagram showing another embodiment of the present invention.

Subsequently, a digital camera 100 according to another embodiment is described. With reference to FIG. 5, the digital camera 100 of this embodiment is an electronic camera similar to the digital camera 10 shown in FIG. 1. The same reference numerals are assigned to the components common to those in FIG. 1, and the detailed description is omitted.

The timing generator (TG) 34 reads out the electric charges (pixel signal) produced in the imaging element 16. The pixel signal, which is the read-out object image signal, is converted into a digital signal, i.e., pixel data, by the AD converter 18, and the converted pixel data is inputted to the first signal processing circuit 20. The first signal processing circuit 20 detects the brightness of the object scene image from the inputted pixel data thereby to create exposure information indicating an exposure state in the imaging element 16, and outputs this information to a CPU 130.

In a state that the custom white-balance setting mode is set by operating the mode setting button 31 and when the fetching button 32 is operated to photograph a previously prepared white-color object, the CPU 130 exposes the imaging element 16. The pixel data obtained by the exposure is integrated by the integrating circuit 28 for each color. From the integrating circuit 28, integrated values Rs, Gs, and Bs are outputted. Based on these values Rs, Bs, and Gs outputted from the integrating circuit 28, the CPU 130 analyzes the object image signal so as to calculate such gains, i.e., Rgain and Bgain, that a level ratio among the R data, the G data, and the B data reaches 1:1:1, i.e. The calculated Rgain and Bgain are stored in the register 130*a* as the gain information Rw and Bw, and further, aperture information Sw indicating a state of the aperture device 13 at a time point when the exposure is performed as a result of the fetching button 32 being operated is stored in a register 130*b*. The details are described later.

Thereafter, the CPU 130 performs a correcting process on the RW and the Bw read out from the register 130*a* according to a difference between a state of the aperture device 13 at a time point when the imaging element 16 is exposed as a result of the shutter button 33 being operated and a state of the aperture device 13 indicated by the aperture information Sw read out from the register 130*b*, and sets the gains of the amp 24*a* and the amp 24*b* as the Rgain and the Bgain, respectively. The details are described later.

When the shutter button 33 is operated, the imaging element 16 is exposed, and the R data and the B data obtained by the exposure are passed through the amp 24*a* and the amp 24*b* to which the gains are thus set and as a result, the gains are imparted.

The R data, B data, and G data that have been imparted with the gains by the amps 24*a*, 24*b*, and 24*c* are subjected to a matrix calculation by the matrix circuit 26. Thereby, Y data, U data, and V data on which the white balance adjustment is performed are produced. The Y data, the U data, and the V data produced in the matrix circuit 26 undergo a compression process in the second signal processing circuit 38, and then, are recorded on the recording medium 40.

Figure 6:
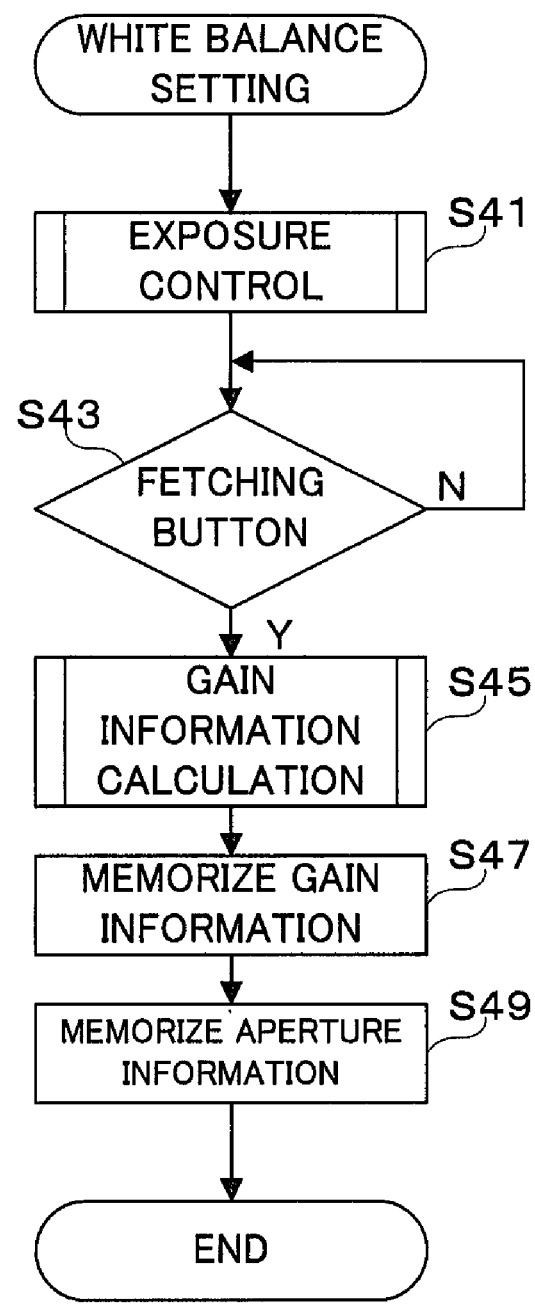
FIG. 6 is a flowchart showing an operation of the other embodiment of the present invention.
Figure 7:
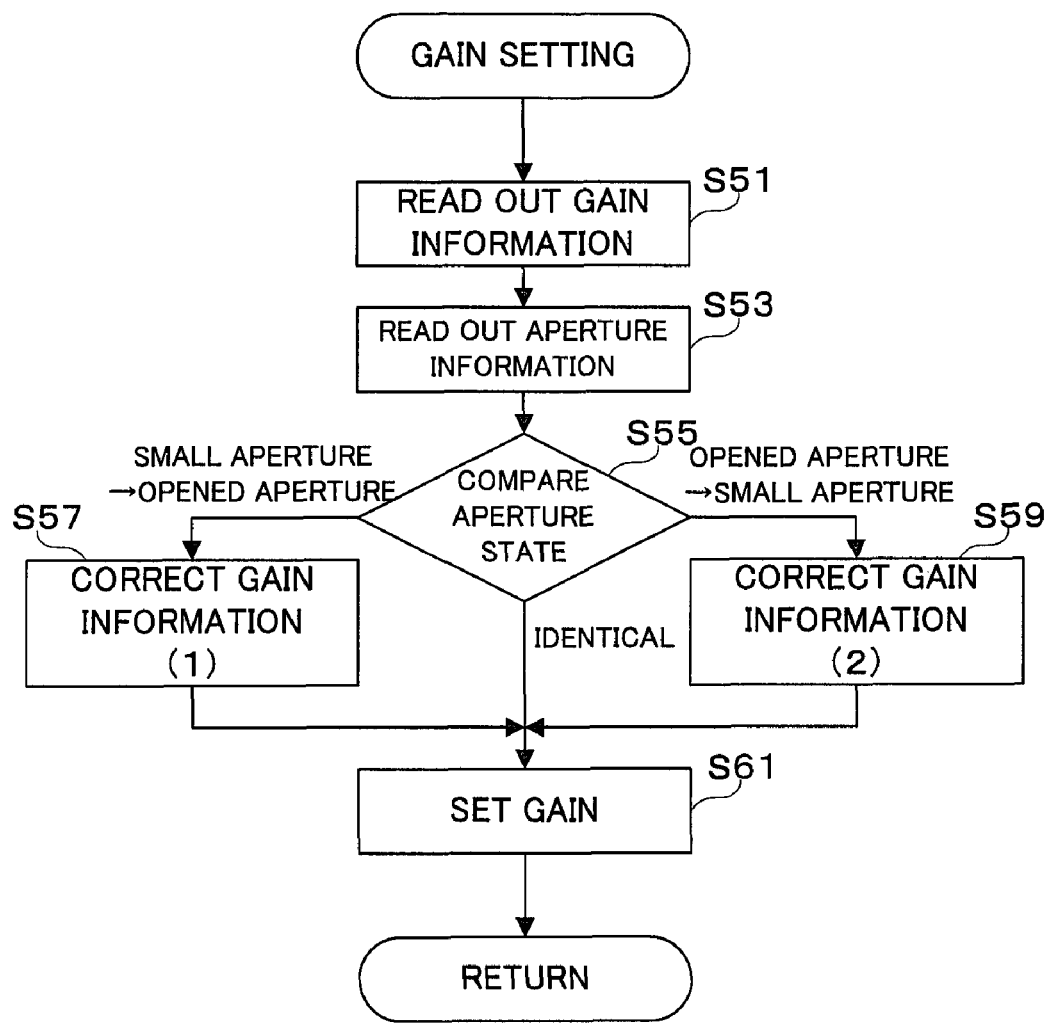
FIG. 7 is a flowchart showing the operation of the other embodiment of the present invention.

The CPU 130 processes flowcharts shown in FIG. 6 and FIG. 7. It is noted that a control program corresponding to these flowcharts is stored in a ROM 142.

When the mode setting button 31 is operated so that the custom white-balance setting mode is set exposure control is firstly performed as a white-balance setting operation (step S41). In the step S41, the brightness of the object scene image is detected from the inputted pixel data thereby to detect an exposure state in the imaging element 16, and then, the aperture device 13, the shutter speed of the electronic shutter by the timing generator (TG) 34, or the AGC within the first signal processing circuit 20 is controlled. By controlling in this way, the optimum exposure is obtained in the imaging element 16.

Thereafter, when the fetching button 32 is operated to photograph the previously prepared white-color object, the CPU 130 exposes the imaging element 16 so as to perform the white balance adjustment. The pixel data obtained by the exposure is integrated by the integrating circuit 28 for each color. From the integrating circuit 28, integrated values Rs, Gs, and Bs are outputted. Based on these values Rs, Gs, and Bs outputted from the integrating circuit 28, the CPU 30 analyzes a screen so as to calculate such gains, i.e., Rgain and Bgain, that a level ratio among the integrated values Rs, Gs, and Bs reaches 1:1:1, i.e., that a color of the object becomes gray (achromatic color) (steps S43 and S45).

The Rgain and the Bgain calculated in the step S5 are stored in the register 130a as the gain information Rw and Bw (step S47), and the aperture information Sw indicating a state of the aperture device 13 at a time point when the exposure is performed as a result of the fetching button 32 being operated is stored in the register 130b (step S49), and then, the white-balance setting operation is ended. The aperture information Sw is information indicating whether the aperture device 13 is in the opened aperture state or in the small aperture state.

The gain information Rw and Bw are stored in the register 130a, and the aperture information Sw is stored in the register 130b, and thereafter, when the shutter button 33 is operated, the custom white balance photography is performed. At this time, the CPU 130 processes a flowchart shown in FIG. 7 as setting of the gain relating to the color information signal.

Firstly, the gain information Rw and Bw stored in the register 130a are read out (step S51), and then, the aperture information Sw stored in the register 130b is read out (step S51).

Subsequently, a state of the aperture device 13 at a current time point and a state of the aperture device 13 indicated by the aperture information Sw are compared. When the states are identical, the gain information Rw and Bw read out in the step S51 are set as such as the Rgain and the Bgain. In this way, the gains of the amps 24a and 24b are set (steps S55 and S61).

When it is detected in the step S55 that the state of the aperture device 13 at a current time point is opened more widely than the state of the aperture device 13 indicated by the aperture information Sw, i.e., when it is detected that the state is changed from the small aperture state to the opened aperture state, the gain information Rw and Bw read out in the step S51 are corrected as a gain information correction (1) by using Equation 3, and the obtained Rgain and Bgain are set as the gains of the amps 24a and 24b (steps S55, S57, and S61).

$Rgain=Rw/K$ ($K$ is a constant smaller than 1)

$Bgain=Bw$ (Equation 3)

When it is detected in the step S55 that a state of the aperture device 13 at a current time point is more closed than a state of the aperture device 13 indicated by the aperture information Sw, i.e., when it is detected that the state is changed from the opened aperture state to the small aperture state, the gain information Rw and Bw read out in the step S51 are corrected as a gain information correction (2) by using Equation 4, and the obtained Rgain and Bgain are set as the gains of the amps 24a and 24b (steps S55, S59, and S61).

$Rgain=Rw*K$ ($K$ is a constant smaller than 1)

$Bgain=Bw$ (Equation 4)

The R data, the B data, and the G data that have been imparted with the gains by the amps 24a, 24b, and 24c are subjected to a matrix calculation by a matrix circuit 26. Thereby, the Y data, the U data, and the V data on which the white balance adjustment is performed are produced. The Y data, the U data, and the V data produced in the matrix circuit 26 undergo a compression process by the second signal-processing circuit 38, and are recorded on the recording medium 40.

According to this embodiment, with respect to the gain information Rw and Bw stored by the white-balance setting operation, when the custom white balance photography is performed as a result of the shutter button 33 being operated after the white-balance setting operation, if it is detected that the state of the aperture device 13 is changed between at a time of the white-balance setting operation and at a time of the custom white balance photography, the read-out gain information Rw and Bw are corrected, and the obtained Rgain and Bgain are set as the gains of the amps 24a and 24b. Therefore, a result of the white balance adjustment, as the white-balance setting operation, set before photographing can be reflected at a time of photographing, by diminishing an influence in which the white balance is deviated by the change in the aperture state.

The embodiment of the present invention is thus described, however, the present invention is not limited to the above embodiment.

As the white-balance setting operation in the custom white-balance setting mode, instead of photographing the previously prepared white-color object, an object image signal obtained by photographing an arbitrary object may be displayed by using a display device, and the white balance may be set manually while observing the display. When the arbitrary object is photographed, as analysis of the object image signal, the entire screen may be divided into a plurality of regions, and the white balance setting may be performed in consideration of a gap in color between each region.

Setting of Ggain may also be enabled, and the Ggain, together with the Rgain and the Bgain, may be stored as the gain information so as to perform a correction according to a difference in aperture state.

Rather than performing exposure control before the fetching button is operated after the custom white-balance setting mode is set by operating the mode setting button 31, the exposure control may be performed before calculating the gain information after the fetching button is operated.

It is not necessary to strictly perform the exposure control in the custom white-balance setting mode unlike the exposure control at a time of photographing in the custom white balance mode, and the exposure control may even be omitted by setting to a predetermined state, etc., without performing the control.

The equations used for the gain correction shown in Equation 1 to Equation 4 are only examples, and depending on each electronic camera, the value of K may possibly be a constant greater than 1. Furthermore, the equations are not limited to multiplication and division of a constant. The equations used for the gain correction can be set appropriately through an experiment, etc. Also, the aperture device may not only have a mechanism for setting either to an opened aperture state in which an opening is large or to a small aperture state in which an opening is small, but also have a mechanism for setting to a plurality of states in which areas of opening differ. The gain information correction in this case may be appropriately executed according to the number of states to be set.

Depending on each electronic camera, the correction may be performed on each gain for two data, i.e., the R data and the B data, or for three data, i.e., the R data, G data, and the B data, rather than being performed on the gain for one color information signal. The color information signal of the present invention may be a color difference signal, such as R-Y or B-Y.

The technical concept forming the basis of the present invention is described below.

In the custom white balance capable of previously maintaining a white balance value preferred by a user, once the white balance value (value of the gain to be imparted to the color signal) is maintained, and thereafter, if there is a change in the camera setting, such as a sensitivity, an aperture, or a CCD drive which is an imaging element, the color balance that enters from the imaging element changes, and as a result, a coloration in the image finally produced deviates from the coloration intended by the user. Therefore, a deviation in the coloration for each camera setting is measured previously, and from the measurement result, the correction value is evaluated and recorded. From a difference in the camera setting between at a time when the user sets the white balance value and at a time of actually photographing, the white balance value is corrected by the recorded correction value so as to nullify the deviation in the coloration.

Figure 8:
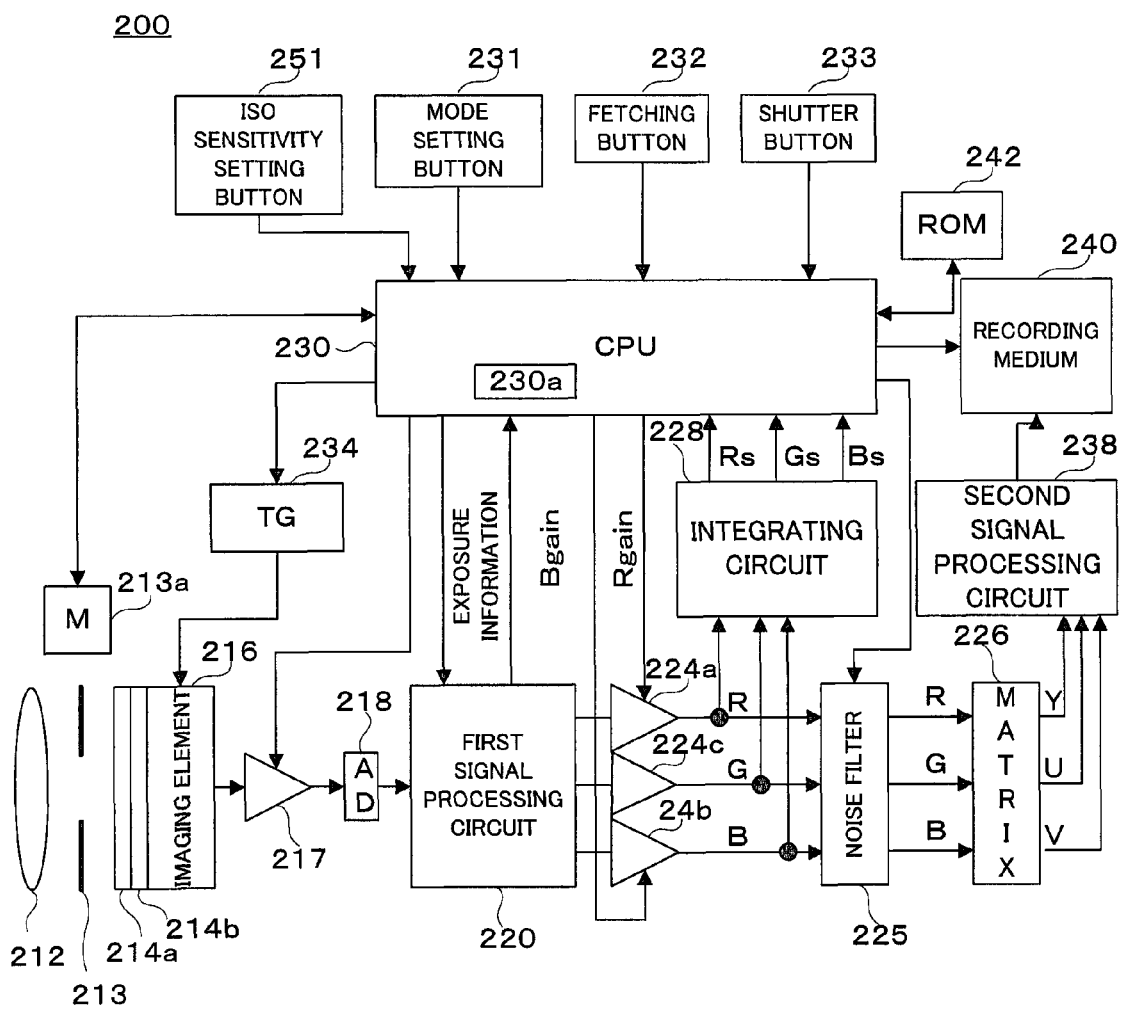
FIG. 8 is a block diagram showing still another embodiment of the present invention.

With reference to FIG. 8, a digital camera 200 of still another embodiment is an electronic camera that includes a lens 212. An optical image of an object is incident upon a light-receiving surface of an imaging element 216 via the lens 212, an aperture device 213 that is driven by a drive device 213a, an infrared cut filter 214a attached to a front surface of the imaging element 216, and a primary color filter 214b. It is noted that the aperture device 213 has a mechanism for setting either to an opened aperture state in which an opening is large or a small aperture state in which an opening is small. Further, the primary color filter 214b has R, G, and B filter elements corresponding to each pixel. Therefore, an amount of electric charges produced in each light-receiving element formed on the light-receiving surface reflects a light amount of R, Q or B.

A timing generator (TG) 234 reads out the electric charges (pixel signal) produced in the imaging element 216. The pixel signal, which is the readout object image signal, is amplified by an amplifier 217 at an amplification factor set by the CPU 230 according to an operation of an ISO sensitivity setting button 251 described later, and thereafter, converted into a digital signal, i.e., pixel data, by an AD converter 218. The converted pixel data is inputted to a first signal processing circuit 220. The first signal processing circuit 220 detects the brightness of the object image from the inputted pixel data so as to create exposure information indicating an exposure state in the imaging element 216, and outputs this information to a CPU 230.

The exposure information is used to control the aperture device 213, and also to control a shutter speed of an electronic shutter by the timing generator (TG) 234 and an AGC within the first signal processing circuit 220. The first signal processing circuit 220 performs signal processes, such as CDS and the above-described AGC, on the inputted pixel data, and also performs color separation on the pixel data on which such signal processes are performed. Thereby, each pixel becomes to have all color information, i.e., R, G, and B. Thus, R data, G data, and B data of the same pixel are outputted simultaneously from the first signal processing circuit 220.

The R data is imparted Rgain by an amp 224a, the B data is imparted Bgain by an amp 224b, and the G data is imparted Ggain by an amp 224c. The R data, the B data, and the G data that have been imparted with the gains in the amps 224a, 224b, and 224c are subjected to noise removal by a noise filer 225, and subjected to a matrix calculation by a matrix circuit 226. Thereby, Y data, U data, and V data are produced. It is noted that "to impart a gain" means to amplify according to the gain.

The R data, the G data, and the B data are also inputted to an integrating circuit 228 at a time of a custom white-balance setting mode described later. The integrating circuit 228 integrates each of the R data, G data, and B data. Thereby, integrated values Rs, Gs, and Bs are produced during one frame period.

In a state that the custom white-balance setting mode is set by operating a mode setting button 231 and when a fetching button 232 is operated to photograph a previously prepared white-color object, the CPU 230 exposes the imaging element 216. The pixel data obtained by the exposure is integrated by the integrating circuit 228 for each color. From the integrating circuit 228, integrated values Rs, Gs, and Bs are outputted. Based on these values Rs, Gs, and Bs outputted from the integrating circuit 228, the CPU 230 analyzes the object image signal so as to calculate such gains, i.e., Rgain and Bgain, that a level ratio among the integrated values Rs, Gs, and Bs reaches 1:1:1, i.e., that a color of the object becomes gray (achromatic color). The calculated Rgain and Bgain are subjected to a correcting process according to an amplification factor imparted to the object image signal by the amplifier 217 at a time point when the exposure is performed as a result of the fetching button 232 being operated, and are stored in a register 230a as gain information Rw and Bw. The details are described later.

Thereafter, the CPU 230 performs a correcting process on the Rw and the Bw read out from the register 230a according to the amplification factor imparted to the object image signal by the amplifier 217 at a time point when the imaging element 216 is exposed as a result of the shutter button 233 being operated, and sets, as the Rgain and the Bgain, respectively, the gains of the amp 224a and the amp 224b. The details are described later. It is noted that "to impart an amplification factor" means to amplify according to the amplification factor.

When the shutter button 233 is operated, the imaging element 216 is exposed, and the R data and the B data obtained by this exposure are passed through the amp 224a and the amp 224b to which the gains are set, as described above, so as to be imparted with the gains.

The R data, the B data, and the G data that have been imparted with the gains in the amps 224a, 224b, and 224c are subjected to noise removal by the noise filer 225, and subjected to a matrix calculation by the matrix circuit 226. Thereby, the Y data, U data, and V data on which the white balance adjustment is performed are produced. The Y data, the U data, and the V data produced in the matrix circuit 226 undergo a compression process by a second signal processing circuit 238, and thereafter, are recorded on a recording medium 240.

The reason why the white balance is deviated when the amplification factors of the amplifier 217 change between at a time of the custom white-balance setting mode and at a time of photographing by operating the shutter button 233 is probably due to the fact that when the amplification factor is changed, a noise component is changed, i.e., as the amplification factor increases, the noise component increases, and thus, the noise component affects signal processes in the noise filter 225, the matrix circuit 226, etc. However, the reason for deviation is not limited thereto.

Figure 9:
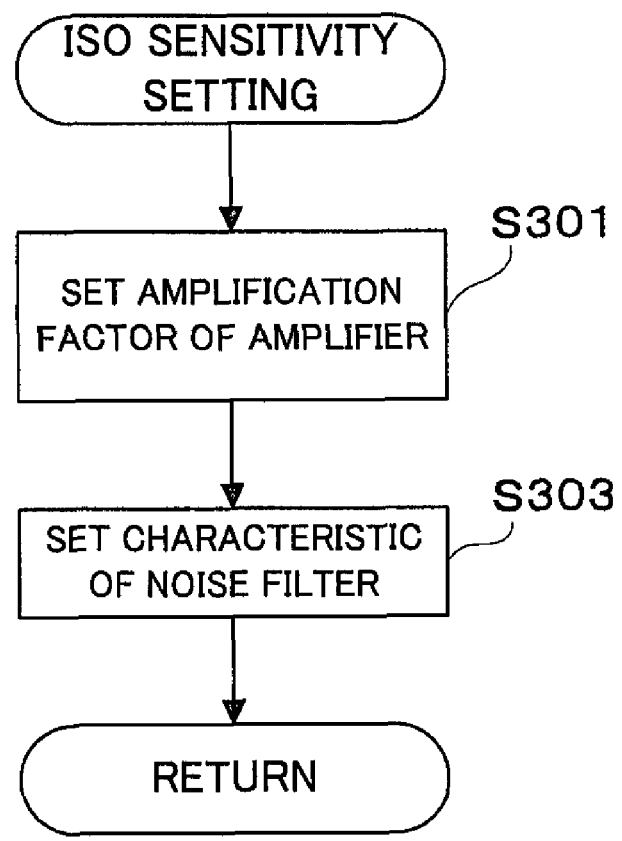
FIG. 9 is a flowchart showing an operation of still another embodiment of the present invention.
Figure 10:
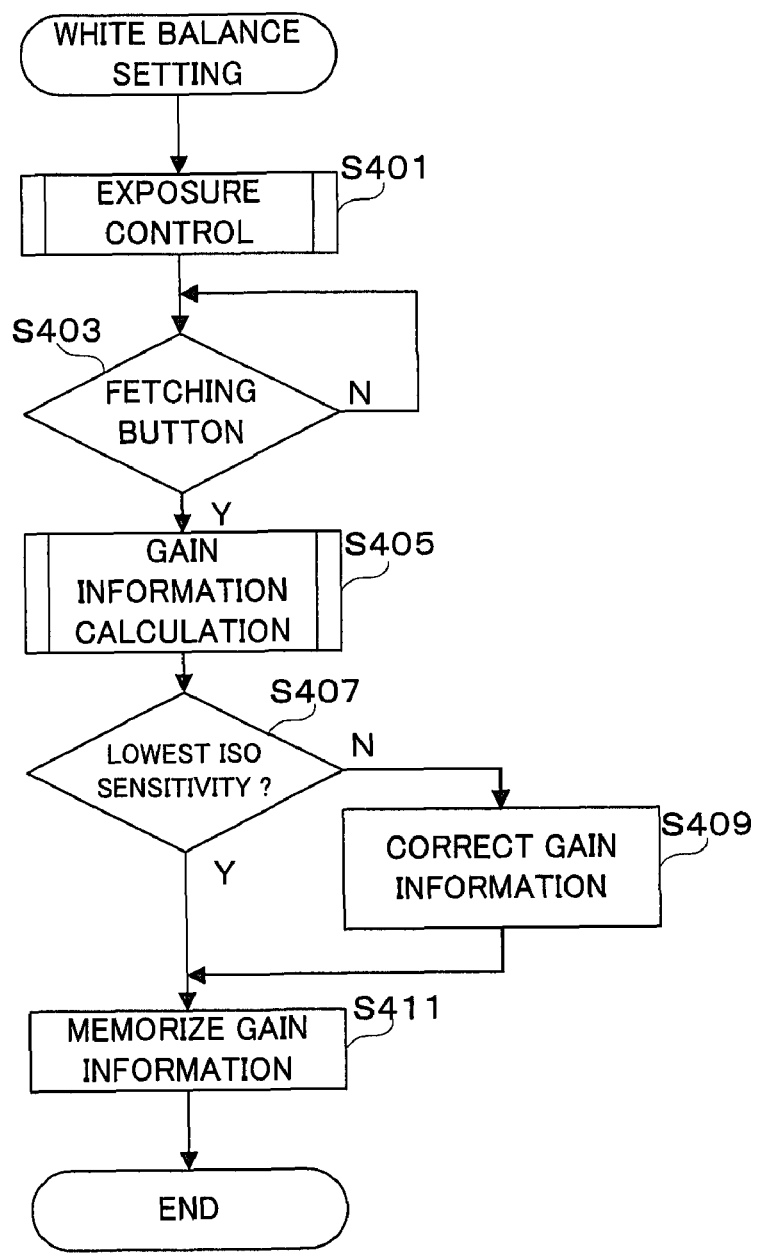
FIG. 10 is a flowchart showing the operation of still another embodiment of the present invention.
Figure 11:
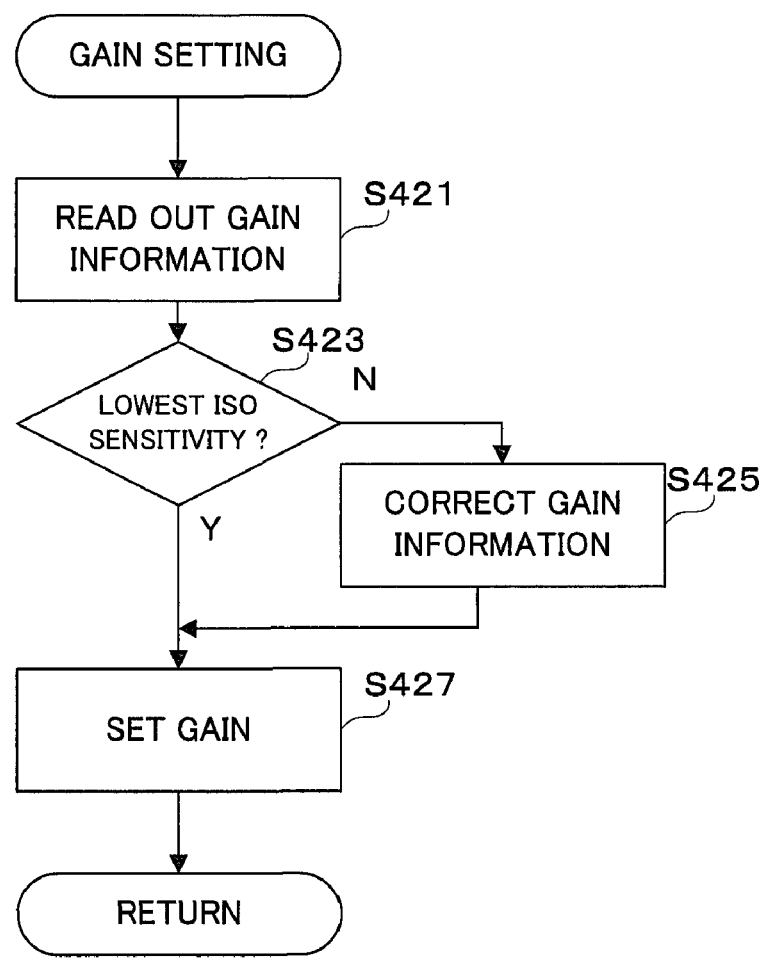
FIG. 11 is a flowchart showing the operation of still another embodiment of the present invention.

The CPU 230 processes a flowchart shown in FIG. 9 to FIG. 11. It is noted that a control program corresponding to this flowchart is stored in a ROM 242.

When an ISO sensitivity setting button 251 is operated, the amplification factor of the amplifier 217 is set such that a light-receiving sensitivity of the imaging element 216 becomes a value equivalent to a designated ISO sensitivity (step S301). In this embodiment the designated ISO sensitivity value is any one of 100, 200, 400, 800, 1600, and 3200, and the set amplification factor is specified to correspond to the value of each ISO sensitivity. That is, the larger the ISO sensitivity value, the larger the value of the set amplification factor, and information indicating the ISO sensitivity value is equal to information indicating the amplification factor of the amplifier 217.

Thus, according to the designated ISO sensitivity value, a characteristic of the noise filter 225 is set (step S303), and the operation performed by operating the ISO sensitivity setting button 251 is ended. The larger the ISO sensitivity value, the larger the value of the amplification factor set to the amplifier 217, and thus, the noise component increases. Therefore, the characteristic is set so that the larger the ISO sensitivity value, the higher an attenuation rate of the noise component of the noise filter 225.

On the other hand, when the mode setting button 231 is operated so that the custom white-balance setting mode is set, the exposure control is firstly performed as a white-balance setting operation (step S401). In the step S401, the brightness of the object image is detected from the inputted pixel data thereby to detect an exposure state in the imaging element 216, and then, the aperture device 213, the shutter speed of the electronic shutter by the timing generator (TG) 234, or the AGC within the first signal processing circuit 220 is controlled. By controlling in this way, the optimum exposure is obtained in the imaging element 216.

Thereafter, when the fetching button 232 is operated to photograph the previously prepared white-color object in order to perform the white balance adjustment, the CPU 230 exposes the imaging element 216. The pixel data obtained by the exposure is integrated by the integrating circuit 228 for each color. From the integrating circuit 228, integrated values Rs, Gs, and Bs are outputted. Based on these values Rs, Gs, and Bs outputted from the integrating circuit 228, the CPU 230 analyzes the screen so as to calculate such gains, i.e., Rgain and Bgain, that a level ratio among the R data, the G data, and the B data reaches 1:1:1, i.e., that a color of the object becomes gray (achromatic color)(steps S403 and S405).

Subsequently, it is detected whether or not the ISO sensitivity value set to the amplifier 217 is a lowest ISO sensitivity, i.e., in this embodiment, it is detected whether or not the ISO sensitivity value is 100 (step S407). When the lowest ISO sensitivity is detected, the Rgain and the Bgain calculated in the step S405 are stored as such in the register 230a as the gain information Rw and Bw (steps S407 and S411), and the white-balance setting operation is ended.

When it is detected in the step S407 that the ISO sensitivity value set to the amplifier 217 is not the lowest ISO sensitivity, i.e., when it is detected that the ISO sensitivity value is not 100, the Rgain and the Bgain calculated in the step S405 are corrected by using Equation 5 when the ISO sensitivity value is between 200 and 800 and corrected by using Equation 6 when the ISO sensitivity value is 1600 or 3200, and the obtained gain information Rw and Bw are stored in the register 230a (steps S407, S409, and S411), and then, the white-balance setting operation is ended.

$Rw=Rgain*KRM(KRM$ is a constant greater than 1)

$Bw=Bgain*KBM(KBM$ is a constant greater than 1)      (Equation 5)

Values of KRM and KBM are determined through an experiment, a simulation, etc., and are about 1.01 to 1.02 in this embodiment, for example.

$Rw=Rgain*KRH(KRH$ is a constant greater than $KRM)$ $Bw=Bgain*KBH(KBH$ is a constant greater than $KRM)$      (Equation 6)

Values of KRH and KBH are determined through an experiment, a simulation, etc., and are about 1.02 to 1.03 in the embodiment, for example.

When the Rgain and the Bgain calculated in the step S405 are corrected by using Equation 5 or 6, the white balance adjustment is performed in a state that the object image signal is amplified as a result of amplifying means being imparting a predetermined amplification factor, and then, gain information indicating the gain that is imparted to the obtained color information signal is obtained.

It is noted that after the gain information Rw and Bw are stored in the register 230a, when the shutter button 233 is operated, the custom white balance photography is performed. However, the ISO sensitivity setting button 251 may be operated before operating the shutter button 233 so as to set the amplification factor of the amplifier 217 such that the light-receiving sensitivity of the imaging element 216 becomes a value equivalent to a designated ISO sensitivity value. At a time of performing the custom white balance photography by operating the shutter button 233, the CPU 230 processes a flowchart shown in FIG. 11 as setting of the gain relating to the color information signal.

Firstly, the gain information Rw and Bw stored in the register 230a are read out (step S421). Subsequently, it is detected whether or not the ISO sensitivity value indicating the amplification factor set to the amplifier 217 is the lowest ISO sensitivity (step S423). When the ISO sensitivity is the lowest ISO sensitivity, i.e., the ISO sensitivity value is 100, the gain information Rw and Bw read out in the step S421 are set as such as the Rgain and Bgain. In this way, the gains of the amps 224a and 224b are set (steps S423 and S427).

When it is detected in the step S423 that the ISO sensitivity value is not the lowest ISO sensitivity, i.e., the ISO sensitivity value is not 100, the gain information Rw and Bw read out in the step S421 are corrected by using Equation 7 when the ISO sensitivity value is between 200 and 800, and by using Equation 8 when the ISO sensitivity value is 1600 or 3200, and the obtained Rgain and Bgain are set as the gains of the amps 224a and 224b (steps S423, S425, and S427).

$Rgain=Rw/KRM(KRM$ is a constant greater than 1)

$Bgain=Bw/KBM(KBM$ is a constant greater than 1)      (Equation 7)

$Rgain=Rw/KRH(KRH$ is a constant greater than $KRM)$ $Bgain=Bw/KBH(KBH$ is a constant greater than $KRM)$      (Equation 8)

Thereafter, the R data, B data, and G data that have been imparted with the gains by the amps 224a, 224b, and 224c are subjected to noise removal by a noise filter 225, and subjected to a matrix calculation by a matrix circuit 226. Thereby, the Y data, U data, and V data on which the white balance adjustment is performed are produced. The Y data, U data, and V data produced in the matrix circuit 226 undergo a compression process in the second signal processing circuit 238, and then, recorded on the recording medium 240.

According to this embodiment, based on the gain that has been imparted to the color information signal obtained by performing the white balance adjustment using the object image signal, the gain information Rw and Bw stored by the white-balance setting operation are calculated and stored as the gain information indicating the gain that is imparted to the color information signal obtained by performing the white balance adjustment in a state that the ISO sensitivity value indicating the amplification factor set to the amplifier 217 is the lowest ISO sensitivity. When it is detected at a time of the custom white balance photography performed thereafter that the ISO sensitivity value is not the lowest ISO sensitivity, i.e., the ISO sensitivity value is not 100, the read-out gain information Rw and Bw are corrected, and the obtained Rgain and Bgain are set as the gains of the amps 224a and 224b. Therefore, a result of the white balance adjustment, as the white-balance setting operation, set before photographing can be reflected at a time of photographing, by diminishing an influence in which the white balance is deviated due to the change of the amplification factor of the amplifier 217 between at a time of the custom white-balance setting mode and at a time that the photography is performed by operating the shutter button 233.

It is noted that in this embodiment, based on the gain that has been imparted to the color information signal obtained by performing the white balance adjustment by using the object image signal, the gain information indicating the gain that is imparted to the color information signal obtained by performing the white balance adjustment is calculated in a state that the object image signal is amplified as a result of the amplifying means being imparting a predetermined amplification factor. Thus, in the white-balance setting operation, unless the ISO sensitivity value indicating the amplification factor that has been set to the amplifier 217 is the lowest ISO sensitivity, the Rgain and the Bgain calculated in the step S405 are corrected, and the gain information Rw and Bw are calculated and stored in the register 230a. However, instead of the flowchart shown in FIG. 10, when the CPU, 230 processes a flowchart shown in FIG. 12, there is no need to perform the correction. By performing the white balance adjustment by obtaining the object image signal in a state that the ISO sensitivity value indicating the amplification factor set to the amplifier 217 is the lowest ISO sensitivity, the white balance adjustment in a state that the ISO sensitivity value is the lowest ISO sensitivity is performed. If the gain information indicating the gain that is imparted to the thus obtained color information signal is calculated, there is no need of performing the correction.

That is, the amplification factor firstly set to the amplifier 217, as the white-balance setting operation, when the custom white-balance setting mode is set by operating the mode setting button 231 is set as an amplification factor equivalent to the lowest ISO sensitivity (step S431). Thereafter, the exposure control is performed (step S433). In the step S433, by detecting the brightness of the object scene image from the inputted pixel data, an exposure state in the imaging element 216 is detected, and then, the shutter speed of the electronic shutter by the timing generator (TG) 234 or the AGC within the first signal processing circuit 220 are controlled so that the optimum exposure is obtained in the imaging element 216.

Thereafter, when the fetching button 232 is operated to photograph the previously prepared white-color object, in order to perform the white balance adjustment, the CPU 230 exposes the imaging element 216. The pixel data obtained by the exposure is integrated by the integrating circuit 228 for each color. From the integrating circuit 228, integrated values Rs, Gs, and Bs are outputted. Based on these values Rs, Gs, and Bs outputted from the integrating circuit 228, the CPU 230 analyzes a screen so as to calculate such gains, i.e., Rgain and Bgain, that a level ratio among the integrated values Rs, Gs, and Bs reaches 1:1:1, i.e., that color of the object becomes gray (achromatic color) (steps S435 and S437).

Then, the Rgain and the Bgain calculated in the step S437 are stored as such in the register 230a as the gain information Rw and Bw (step S439), and then, the white-balance setting operation is ended.

Figure 12:
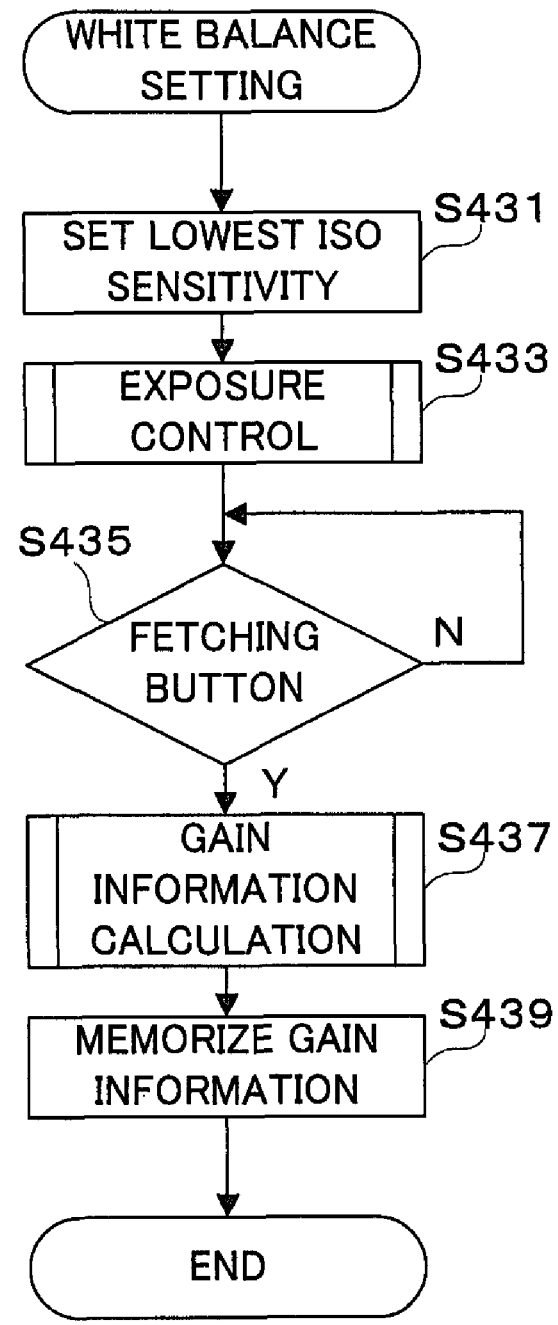
FIG. 12 is a flowchart showing another operation of still another embodiment of the present invention.

It is noted that the flowchart shown in FIG. 12 is processed instead of the flowchart shown in FIG. 10, and then, the gain information Rw and Bw are stored in the register 230a, and thereafter, when the shutter button 233 is operated, the custom white balance photography is performed. The CPU 230 at this time processes the flowchart, described above, shown in FIG. 11. Therefore, its description is omitted.

Figure 13:
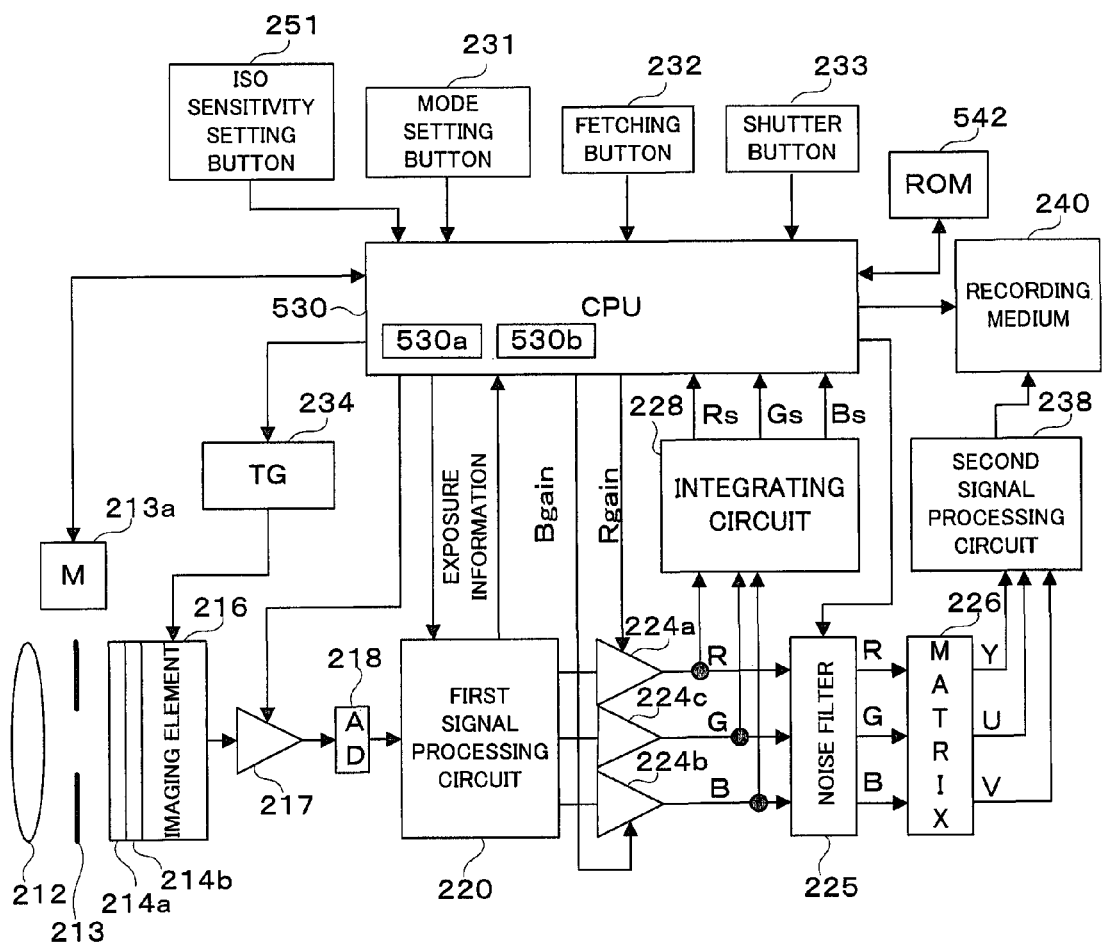
FIG. 13 is a functional block diagram showing yet still another embodiment of the present invention.

Subsequently, a digital camera 500 which is yet still another embodiment is described. With reference to FIG. 13, the digital camera 500 of this embodiment is also an electronic camera similarly to the digital camera 200 shown in FIG. 8. The same reference numerals are assigned to the components common to those in FIG. 8, and the detailed description is omitted.

A timing generator (TG) 234 reads out electric charges (pixel signal) produced in the imaging element 216. The pixel signal, which is the readout object image signal, is amplified by an amplifier 217 at an amplification factor set by a CPU 530 according to an operation of the ISO sensitivity setting button 251, and thereafter, converted into a digital signal, i.e., pixel data, by the AD converter 218. The converted pixel data is inputted to the first signal processing circuit 220. The first signal processing circuit 220 detects the brightness of the object scene image from the inputted pixel data thereby to create exposure information indicating an exposure state in the imaging element 216, and outputs this information to the CPU 530.

In a state that the custom white-balance setting mode is set by operating the mode setting button 231 and when the fetching button 232 is operated to photograph a previously prepared white-color object, the CPU 530 exposes the imaging element 216. The pixel data obtained by the exposure is integrated by the integrating circuit 228 for each color. From the integrating circuit 228, integrated values Rs, Gs, and Bs are outputted. Based on these values Rs, Gs, and Bs outputted from the integrating circuit 228, the CPU 530 analyzes the object image signal so as to calculate such gains, i.e., Rgain and Bgain, that a level ratio among the R data, the G data, and the B data reaches 1:1:1. The calculated Rgain and Bgain are stored in a register 530a as the gain information Rw and Bw, and further, the ISO sensitivity information Gw indicating the amplification factor imparted to the object image signal by the amplifier 217 at a time point when the exposure is performed as a result of the fetching button 232 being operated is stored in a register 530b. The details are described later.

Thereafter, the CPU 530 performs a correcting process on the Rw and Bw read out from the register 530a according to a difference between the amplification factor imparted to the object image signal by the amplifier 217 at a time point when the imaging element 216 is exposed as a result of the shutter button 233 being operated and the amplification factor indicated by the ISO sensitivity information Gw read out from the register 530b, and sets the gains, as the Rgain and the Bgain, respectively, of the amp 224a and the amp 224b. The details are described later.

When the shutter button 233 is operated, the imaging element 216 is exposed, and the R data and the B data obtained by this exposure are passed through the amp 224a and the amp 224b to which the gains are set, as described above, so as to be imparted with the gains.

The R data, the B data, and the G data that have been imparted with the gains in the amps 224a, 224b, and 224c are subjected to noise removal by a noise filer 225, and subjected to a matrix calculation by a matrix circuit 226. Thereby, the Y data, U data, and V data in which the white balance adjustment is performed are produced. The Y data, U data, and V data produced in the matrix circuit 226 undergo a compression process by the second signal-processing circuit 238, and then, are recorded on the recording medium 240.

Figure 14:
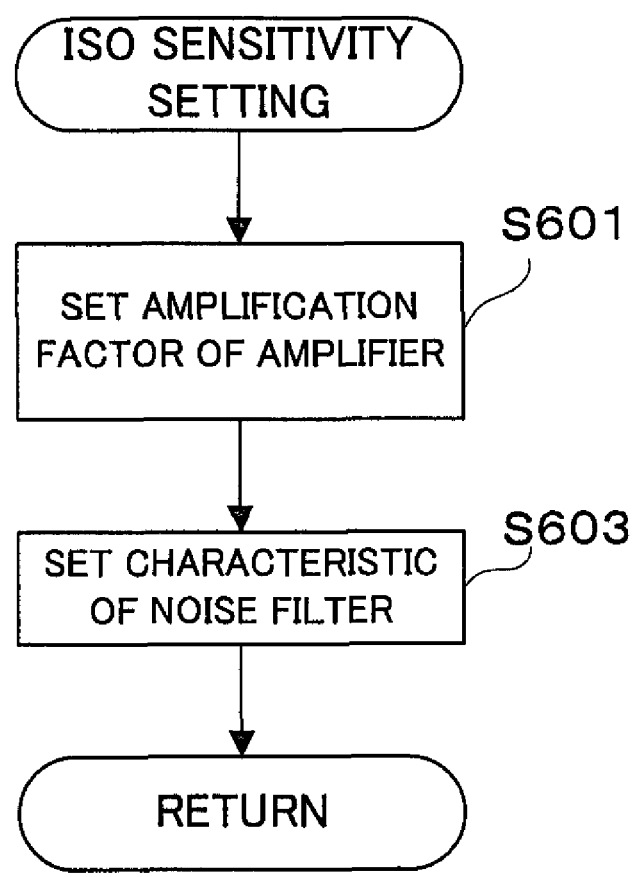
FIG. 14 is a flowchart showing an operation of yet still another embodiment of the present invention.
Figure 15:
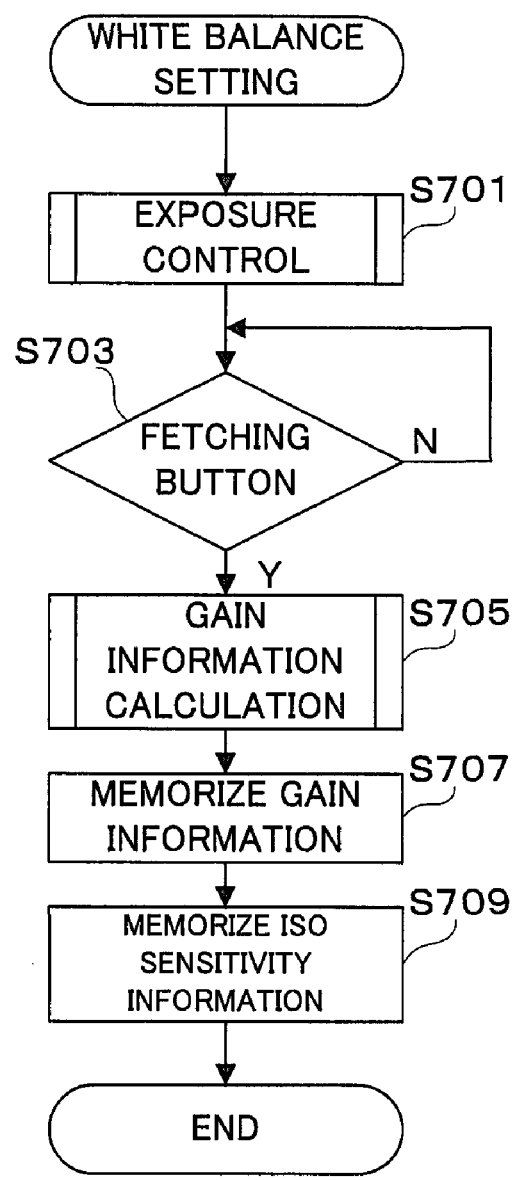
FIG. 15 is a flowchart showing the operation of yet still another embodiment of the present invention.
Figure 16:
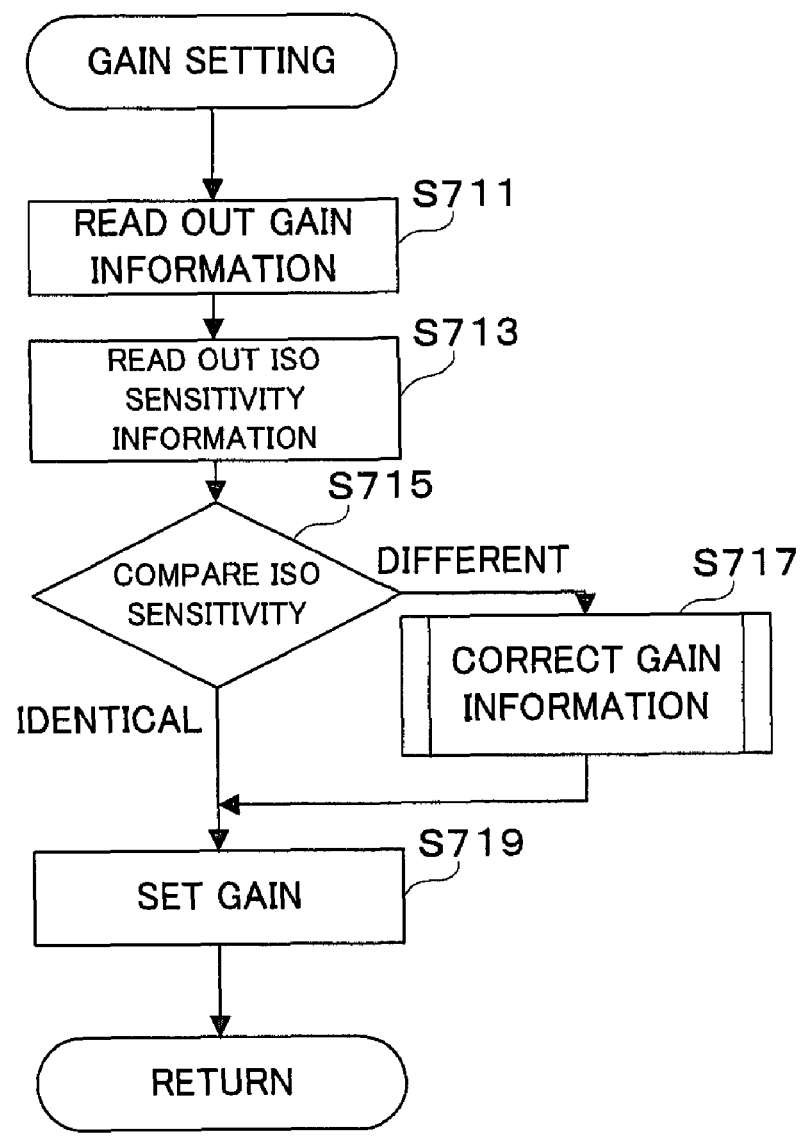
FIG. 16 is a flowchart showing the operation of yet still another embodiment of the present invention.

The CPU 530 processes flowcharts shown in FIG. 14 to FIG. 16. It is noted that a control program corresponding to these flowcharts is stored in a ROM 542.

When an ISO sensitivity setting button 251 is operated, the amplification factor of the amplifier 217 is set such that a light-receiving sensitivity of the imaging element 216 becomes a value equivalent to a designated ISO sensitivity (step S601). In this embodiment, the designated ISO sensitivity values are any one of 100, 200, 400, 800, 1600, and 3200, and the set amplification factor is specified to correspond to the value of each ISO sensitivity. That is, the larger the ISO sensitivity value, the larger the value of the set amplification factor, and information indicating the ISO sensitivity value is equal to information indicating the amplification factor of the amplifier 217.

Thus, according to the designated ISO sensitivity value, a characteristic of the noise filter 225 is set (step S603), and the operation performed by operating the ISO sensitivity setting button 251 is ended. The larger the ISO sensitivity value, the larger the value of the amplification factor set to the amplifier 217, and thus, the noise component increases. Therefore, the characteristic is set so that the larger the ISO sensitivity value, the higher an attenuation rate of the noise component of the noise filter 225.

On the other hand, when the mode setting button 231 is operated to set to the custom white-balance setting mode, the exposure control is firstly performed as a white-balance setting operation (step S701). In the step S701, the brightness of the object image is detected from the inputted pixel data thereby to detect an exposure state in the imaging element 216, and then, the aperture device 213, the shutter speed of the electronic shutter by the timing generator (TG) 234, or the AGC within the first signal processing circuit 220 is controlled. By controlling in this way, the optimum exposure is obtained in the imaging element 216.

Thereafter, when the fetching button 232 is operated to photograph the previously prepared white-color object, in order to perform the white balance adjustment, the CPU 530 exposes the imaging element 216. The pixel data obtained by the exposure is integrated by the integrating circuit 228 for each color. From the integrating circuit 228, integrated values Rs, Gs, and Bs are outputted. Based on these values Rs, Gs, and Bs outputted from the integrating circuit 228, the CPU 530 analyzes the screen so as to calculate such gains, i.e., Rgain and Bgain, that a level ratio among the integrated values Rs, Gs, and Bs reaches 1:1:1, i.e., that a color of the object becomes gray (achromatic color) (steps S703 and S705).

The Rgain and the Bgain calculated in the step S705 are stored in the register 530*a* as the gain information Rw and Bw (step S707), and the ISO sensitivity information Gw indicating the amplification factor imparted to the object image signal by the amplifier 217 at a time point when the exposure is performed as a result of the fetching button 232 being operated is stored in the register 530*b* (step S709). Then, the white-balance setting operation is ended.

It is noted that if after the gain information Rw and Bw is stored in the register 530*a*, the custom white balance photography is performed by operating the shutter button 233. However, the ISO sensitivity setting button 251 may be operated before operating the shutter button 233 so as to set the amplification factor of the amplifier 217 such that the light-receiving sensitivity of the imaging element 216 becomes a value equivalent to the designated ISO sensitivity value. At a time of the custom white balance photography performed by operating the shutter button 233, the CPU 530 processes a flowchart shown in FIG. 16 as setting of gains relating to the color information signal.

Firstly, the gain information Rw and Bw stored in the register 530*a* are read out (step S711), and the ISO sensitivity information Gw stored in the register 530*b* is read out (step S713).

Subsequently, a comparison is made between the ISO sensitivity value indicating the amplification factor imparted to the object image signal by the amplifier 217 at a cent time point, and the ISO sensitivity value indicating the amplification factor imparted to the object image signal by the amplifier 217 indicated by the ISO sensitivity information Gw. When the values are identical, the gain information Rw and Bw read out in the step S711 are set as such as the Rgain and the Bgain. In this way, the gains of the amps 224*a* and 224*b* are set (steps S715 and S719).

When it is detected in the step S715 that the ISO sensitivity value indicating the amplification factor imparted to the object image signal by the amplifier 217 at a current time point is different from the ISO sensitivity value indicating the amplification factor imparted to the object image signal by the amplifier 217 indicated by the ISO sensitivity information Gw, the gain information Rw and Bw read out in the step S711 are corrected by using Equation 9, and the obtained Rgain and Bgain are set as the gains of the amps 224*a* and 224*b* (steps S715, S717, and S719).

$$Rgain = Rw * KR(L,M)$$

$$Bgain = Bw * KB(L,M) \quad \text{(Equation 9)}$$

It is noted that the constants KR (L,M) and KB (L,M) are constants stored in the ROM 542 in an array form. Then, a value of L is set to "1" when the ISO sensitivity value indicating the amplification factor imparted to the object image signal by the amplifier 217 indicated by the ISO sensitivity information Gw is 100, set to "2" when the same is between 200 and 800, and set to "3" when the same is 1600 or 3200. A value of M is set to "1" when the ISO sensitivity value indicating the amplification factor imparted to the object image signal by the amplifier 217 at a current time point is 100, set to "2" when the same is between 200 and 800, and set to "3" when the same is 1600 or 3200. In this manner, the constants KR (L,M) and KB (L,M) are specified, and used for the correcting process. The constants KR (L,M) and KB (L,M) are constants having a value in the vicinity of 1 except for 1, and are determined through an experiment, a simulation, etc.

The R data, B data, and G data that have been imparted with the gains by the amps 224*a*, 224*b*, and 224*c* are subjected to noise removal by a noise filter 225, and subjected to a matrix calculation by a matrix circuit 226. Thereby, the Y data, the U data, and the V data in which the white balance adjustment is performed are produced. The Y data, the U data, and the V data produced in the matrix circuit 226 undergo a compression process in the second signal processing circuit 238, and are recorded on the recording medium 240.

According to this embodiment, with respect to the gain information Rw and Bw stored by the white-balance setting operation, when the custom white balance photography is performed as a result of the shutter button 233 being operated after the white-balance setting operation, if it is detected that the amplification factor imparted to the object image signal by the amplifier 217 is changed between at a white-balance setting operation time and at a custom white balance photography time, the read-out gain information Rw and Bw are corrected, and the obtained Rgain and Bgain are set as the gains of the amps 224*a* and 224*b*. Therefore, a result of the white balance adjustment set, as the white-balance setting operation, before photographing can be reflected at a time of photographing, by diminishing an influence in which the white balance is deviated by the change in the amplification factor imparted to the object image signal by the amplifier 217.

Thus, the embodiments of the present invention are described. However, the present invention is not limited to the above-described embodiments.

As the white-balance setting operation in the custom white-balance setting mode, instead of photographing the previously prepared white-color object, an object image signal obtained by photographing an arbitrary object may be displayed by using a display device, and the white balance may be set manually while observing the display. When the arbitrary object is photographed, as analysis of the object image signal, the entire screen may be divided into a plurality of regions, and the white balance setting may be performed in consideration of a gap in color between each region.

Setting of Ggain may also be enabled, and the Ggain, together with the Rgain and the Bgain, may be stored as the gain information so as perform a correction according to a difference in amplification factor imparted to the object image signal by the amplifier 217.

Rather than performing exposure control before the fetching button is operated after the custom white-balance setting mode is set by operating the mode setting button 231, the exposure control may be performed before calculating the gain information after the fetching button is operated.

It is not necessary to strictly perform the exposure control in the custom white-balance setting mode unlike the exposure control at a time of photographing in the custom white balance mode, and the exposure control may even be omitted by setting to a predetermined state, etc., without performing the control.

The equations used for the gain correction shown in Equation 5 to Equation 9 are only examples, and depending on each electronic camera, the value of each constant may possibly be a constant smaller than 1. Furthermore, the equations are not limited to multiplication and division of a constant. The equations used for the gain correction may be appropriately set through an experiment a simulation, etc.

Depending on each electronic camera, the correction may be performed on each gain for one data, i.e., the R data or the B data, or for three data, i.e., the R data, G data, and the B data, rather than being performed on the gain for the two color information signals. The color information signal of the present invention may be a color difference signal, such as R-Y or B-Y.

The values of the ISO sensitivity to be set differ depending on each electronic camera, and are not necessarily selected from 100, 200, 400, 800, 1600, and 3200.

The gain correction may be performed based on a difference of the ISO sensitivity values themselves rather than performing based on the difference of the values of the ISO sensitivity among the three sections, i.e., 100; 200 to 800; and 1600 or 3200.

The setting of the ISO sensitivity at a time of photographing may not only be performed automatically by the exposure control but also by manually by the ISO sensitivity setting button.

The technical concept forming the basis of the present invention is described below.

In the custom white balance capable of previously maintaining a white balance value preferred by a user, once the white balance value (value of the gain to be imparted to the color signal) is maintained, and thereafter, if there is a change in the camera setting, such as a sensitivity, an aperture, or a CCD drive which is an imaging element, the color balance that enters from the imaging element changes, and as a result, a coloration in the image finally produced deviates from the coloration intended by the user. Therefore, a deviation in the coloration for each camera setting is measured previously, and from the measurement result, the correction value is evaluated and recorded. From a difference in the camera setting between at a time when the user sets the white balance value and at a time of actually photographing, the white balance value is corrected by the recorded correction value so as to nullify the deviation in the coloration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
a gain information calculator which calculates gain information indicating a gain that is imparted to a color information signal obtained by performing a white balance adjustment in a predetermined optical aperture state based on a gain that has been imparted to a color information signal obtained by performing a white balance adjustment by using an object image signal;
a storer which stores the gain information calculated by said gain information calculator;
a detector which detects a difference between an aperture state at a time of photographing and the predetermined optical aperture state;
a corrector which corrects the gain information stored by said storer based on the difference detected by said detector; and
an adjustor which adjusts a color information signal at a time of photographing by using the gain information corrected by said corrector,
wherein when there is a difference between an optical aperture state when an object image signal used for the white balance adjustment is obtained and the predetermined optical aperture state, said gain information calculator calculates the gain information indicating a gain that is imparted to the color information signal obtained by performing the white balance adjustment in the predetermined optical aperture state by correcting the gain that has been imparted to the color information signal obtained by performing the white balance adjustment according to the difference.

2. An electronic camera according to claim 1, wherein said gain information calculator performs the white balance adjustment by obtaining the object image signal in a state set to the predetermined optical aperture state thereby calculating the gain information indicating the gain that is imparted to the color information signal obtained by performing the white balance adjustment in the predetermined optical aperture state.

* * * * *